(No Model.)

W. DE LANY, Jr.
AIR VALVE.

No. 598,217. Patented Feb. 1, 1898.

Witnesses.
Inventor:
Wm. De Lany Jr.
by Fetherstonhaugh & Co
Attys.

UNITED STATES PATENT OFFICE.

WILLIAM DE LANY, JR., OF COBOURG, CANADA.

AIR-VALVE.

SPECIFICATION forming part of Letters Patent No. 598,217, dated February 1, 1898.

Application filed March 30, 1897. Serial No. 629,907. (No model.)

*To all whom it may concern:*

Be it known that I, WILLIAM DE LANY, Jr., jeweler, of the town of Cobourg, in the county of Northumberland, in the Province of Ontario, Canada, have invented certain new and useful Improvements in Air-Valves, of which the following is a specification.

My invention relates to improvements in air-valves more particularly adapted for pneumatic tires for bicycles; and the object of the invention is to design a simple, positive, and effectual form of valve which when closed will absolutely prevent any escape of air through it; and it consists, essentially, of a valve having a plug provided with a leather washer which is designed to be brought down against a flat seat at the bottom of the upper chamber of the valve, the lower portion of the plug having a stem which is encircled by a spring held in the lower portion of the valve and pressing against a pin in the stem, so as to normally exert an upward pressure upon the plug, a closing-stem being provided above the plug which is held in a cap provided with a screwed projection fitting into a corresponding opening in the top of the valve, such cap being designed to be screwed home, so as to press the central stem upon the center of the plug to hold it securely upon its seat, and such cap being designed to be removed and the stem moved longitudinally inwardly therein after removal of the cap to press upon the plug and hold it centrally in the upper chamber of the valve, so as to permit of the deflation of the tire, as hereinafter more particularly explained.

Figure 1:
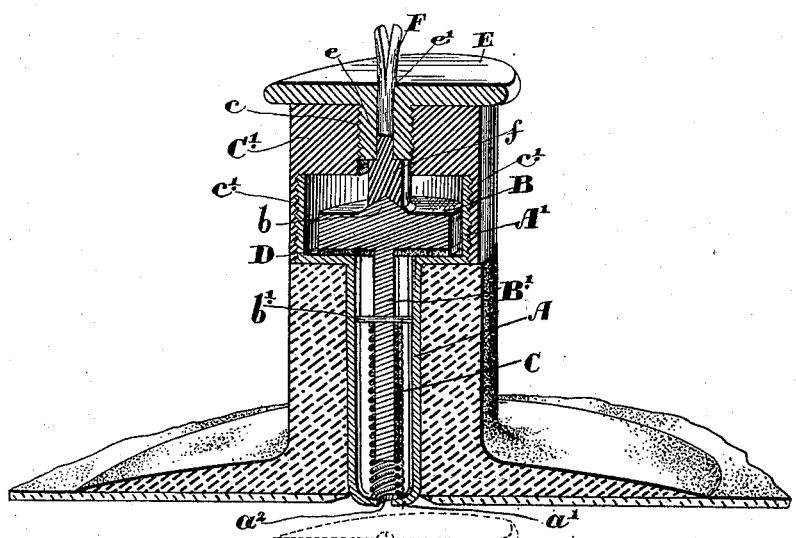
Figure 2:
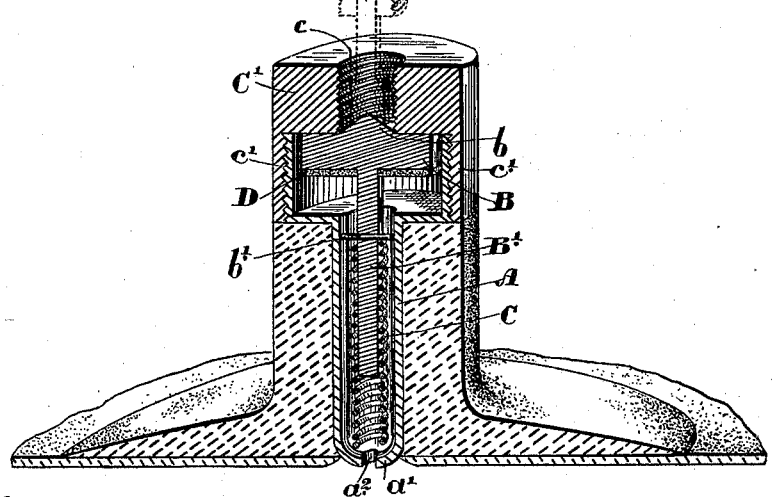

Figure 1 is a sectional perspective view of a valve, showing it closed. Fig. 2 is a similar view showing the valve with the cap removed.

In the drawings like letters of reference indicate corresponding parts in each figure.

Heretofore it has been common in valves to have the plug located in the lower portion of the valve, the upper portion of the plug having a stem which extends into the upper portion of the valve. The upper portion of the plug is held by a spring against its seat. In this construction the pressure of the air to the inside of the valve helps to force it upon its seat. As, however, frequently dust accumulates on the seat and the spring, which is necessarily a fine one, becomes weak, it happens that the plug of the valve does not close directly upon its seat, being separated therefrom by small particles of dust, and consequently the air gradually escapes. It is with the object of overcoming the difficulty experienced in this class of valve and producing one which is positive and not depending upon the spring and the pressure of the air for closing the valve that my invention is chiefly designed.

A is the lower portion of the valve, which is cylindrical in shape and provided with an enlarged upper portion A', which is also cylindrical in shape and externally threaded, as indicated.

B is the plug of the valve, which is provided with the usual center $b$ and a depending stem B'.

$b'$ is a pin extending through the stem B' into the longitudinal grooves $a$, made in the interior of the cylindrical portion A.

$a'$ is the inturned end of the cylindrical portion A', which forms a hole $a^2$ for the passage of the air.

C is a spiral spring which encircles the stem B' and extends between the pin $b$ and the inturned end $a'$ of the cylindrical portion A of the valve.

D is a washer, preferably of leather, surrounding the stem B' at the lower side of the plug B. The plug B is necessarily of smaller diameter than that of the internal diameter of the enlarged cylindrical portion A'.

C' is the upper portion of the valve, which is provided with a central aperture $c$, internally threaded, and downwardly-depending flanges $c'$, internally threaded. The upper portion C' is screwed down upon the exterior thread formed on the cylindrical portion A'.

E is a cap which is provided with a downwardly-extending projection $e$, exteriorly threaded and designed to be screwed into the central aperture $c$, as indicated.

F is a split stem which extends through a central aperture $e'$ in the projection $e$. The split stem F is provided with an enlarged lower end $f$, which has a conical recess at its lower end designed when the cap E is screwed home to press against the conical projection $b$ of the plug B and thereby hold the valve firmly down upon its seat.

In the position shown in Fig. 1 it will be clearly seen that as the plug B of the valve is held with the washer D firmly down upon its seat $A^2$ there will be no possibility of any air escaping beyond the lower portion of the valve.

By unscrewing and removing the cap E the plug is caused by the spring C to resume the position shown in Fig. 2, in which position it may be thrown down by the stem F when thrust down into the aperture e', as indicated in dotted lines in Fig. 2, and thereby allow the deflation of the tire or the air to escape. By replacing the plug in the position shown in Fig. 1 the cap may be screwed down again and the valve closed, as indicated in Fig. 1.

In this form of valve it will be seen that the cap and stem positively close the valve, which therefore depends upon no spring except to throw it open, and such a spring may be made much stronger than those ordinarily employed in valves. The pin b', extending into the groove a, also serves to keep the plug B level, so that with the conical projection and stem with conical recess it is always insured of being forced down securely upon its seat.

My invention also possesses a decided advantage in that I am able to remove the plug and spring from the lower cylindrical portion of the valve without removing it from the rubber stem in the event of having to renew the leather washer, a point which will be greatly appreciated by manufacturers and repairers, as they can furnish their customers with extra washers.

It is of course understood that the rubber stem or mushroom is generally attached to the lower portion of the valve by wire, and therefore the advantage of not having to remove the lower portion of the stem will be readily comprehended.

What I claim as my invention is—

1. An air-valve comprising the lower cylindrical portion provided with an enlarged upper cylindrical end, the passage leading therefrom to the exterior of the valve, the plug, the downwardly-extending stem, a spring encircling the stem and designed to normally exert an upward pressure upon the plug to close said passage when not restrained, the cap with downwardly-extending stem designed to be screwed into the upper portion of the valve and exert a clamping pressure upon the plug, so as to hold it on its seat as and for the purpose specified.

2. An air-valve comprising the lower cylindrical portion provided with an enlarged upper cylindrical end the passage leading therefrom to the outside of the valve, the plug having a conical upwardly-extending projection, the downwardly-extending stem, a spring encircling the stem and designed to normally exert an upward pressure upon the plug to close said passage when not restrained, the cap with downwardly-extending stem provided with conical recesses designed to be screwed into the upper portion of the valve and exert a clamping pressure upon the plug, so as to hold it on its seat as and for the purpose specified.

3. In an air-valve, in combination the lower cylindrical portion having the enlarged upper end forming a central chamber, the plug located in the chamber, of less diameter than the same and having a downwardly-extending stem, the pin extending through the stem of the plug, the spiral spring encircling the stem and extending between the pin and the bottom of the lower cylindrical portion, the side grooves in the lower cylindrical portion into which the pin extends, the upper portion of the plug closing the top of the central chamber and means for normally holding the plug pressed down upon its seat as and for the purpose specified.

4. In combination the lower cylindrical portion having the enlarged upper end forming a central chamber, the plug located in the chamber and of less diameter than the same, a spring beneath the plug for exerting a normal upward pressure upon it, the exterior thread formed on the outer wall of the central chamber, the upper portion of the valve having a downwardly-extending flange, which is screwed onto the wall of the central chamber, the central aperture in the upper portion of the valve internally threaded, the cap provided with a downward projection externally threaded to fit the aperture and a projecting stem attached to or forming part of the projection and designed to be brought to press against the plug, so as to hold it on its seat as and for the purpose specified.

5. In combination, the lower cylindrical portion having the enlarged upper end forming a central chamber, the plug located in the chamber and of less diameter than the same, a spring beneath the plug for exerting a normal upward pressure upon it, the exterior thread formed on the outer wall of the central chamber, the upper portion of the valve having a downwardly-extending flange, which is screwed onto the wall of the central chamber, the central aperture in the upper portion of the valve internally threaded, the cap provided with a downward projection externally threaded to fit the aperture and a split stem provided with an enlarged lower portion, which is designed to be pressed against the top of the plug as and for the purpose specified.

6. An air-valve comprising the lower cylindrical portion provided with an enlarged upper cylindrical end, the plug, the downwardly-extending stem, a spring encircling the stem, said spring being confined in said lower cylindrical portion and designed to normally exert an upward pressure upon the plug, a cap closing the upper portion of the valve and means within the cap for normally holding the plug pressed down upon its seat as and for the purpose specified.

WILLIAM DE LANY, JR.

Witnesses:
B. BOYD,
H. DENNISON.